United States Patent [19]

Yuasa et al.

[11] Patent Number: 4,469,437
[45] Date of Patent: Sep. 4, 1984

[54] LIGHT MEASUREMENT AND LIGHT CONTROL DATA CALCULATION DEVICE FOR A PHOTOGRAPHIC ENLARGER

[75] Inventors: Yoshio Yuasa, Kawachinagano; Hidetoshi Yasumoto, Tondabayashi; Kazuhiko Naruse, Nabari; Nobukazu Kawagoe, Sakai; Masahito Inaba, Ikeda, all of Japan

[73] Assignee: Minolta Camera Kabushiki Kaisha, Osaka, Japan

[21] Appl. No.: 471,009

[22] Filed: Mar. 1, 1983

[30] Foreign Application Priority Data

Mar. 2, 1982 [JP] Japan ................... 57-33245

[51] Int. Cl.³ .................. G03B 27/74; G03B 27/80
[52] U.S. Cl. ........................ 355/68; 355/35; 355/38; 355/69; 355/77
[58] Field of Search .............. 355/38, 55, 37, 68, 355/69, 35, 77; 356/404, 406, 434, 435

[56] References Cited

U.S. PATENT DOCUMENTS 3,647,296  3/1972  Long ........................ 355/68 X
3,702,732  11/1972  Sliwkowski ............... 355/69 X
3,724,946  4/1973  Knapp ......................... 355/68
3,813,158  5/1974  Zahn ........................ 355/68 X
3,825,336  7/1974  Reynolds ................. 355/37 X
4,167,327  9/1979  DiNatale ..................... 355/77

Primary Examiner—John Gonzales
Assistant Examiner—Delia Rutledge
Attorney, Agent, or Firm—Jackson, Jones & Price

[57] ABSTRACT

Disclosed herein is a light measuring and control data calculating device for use in a photographic enlarger. The device comprises first light detecting means for detecting the amount of light emitted from a light source, second light detecting means for detecting the emitted light amount at a position on the surface of an easel through the optical system and an original film in the enlarger, setting means for manually setting a preliminary desired amount of light to be emitted from the light source and calculation means for calculating an actually desired amount of flash light to be emitted from the light source for obtaining a desired total amount of the exposure light on the surface of the easel for making a suitable exposure on the printing paper to provide a best print.

25 Claims, 9 Drawing Figures

| Fig.7(a) | Fig.7(b) |

LIGHT MEASUREMENT AND LIGHT CONTROL DATA CALCULATION DEVICE FOR A PHOTOGRAPHIC ENLARGER

FIELD OF THE INVENTION

The present invention relates to a light measurement and light control data calculation device for a photographic enlarger, and more particularly, to a device which is adapted to measure the amount of the light incident on a surface of a printing paper on an easel plate in the photographic enlarger or a surface optically equivalent to the printing paper surface and obtain data representing the required amount of light to be emitted from the light source of the enlarger.

BACKGROUND OF THE INVENTION

When, in general, a monochrome photograph is to be enlarged by a small-sized photographic enlarger, a projection lens of a focal length is selected by the operator in compliance with the desired enlarging magnification, and attached to an enlarger head in or through which a negative or positive film referred to as original film as including both negative and positive films is set. Then, upon appropriate determination of the distance between the head including a light source, the film and the projection lens and a surface of a printing paper, the focus of the projection lens and/or the diaphragm aperture are adjusted to desired values, thereby a desired state of an enlarging optical system being established. Thereafter a trial printing is made several times to determine the amount of light to be emitted from the light source of the photographic enlarger for obtaining a desired print. In a photographic enlarger of a conventional type having its lamp energized continuously during exposure to emit constant intensity light, the amount of light from the lamp can be determined by the period of the lamp energization, i.e., the exposure time. Then the operator may memorize the exposure time for the best print and manually control the period of the lamp energization in accordance with his or her memory. Otherwise, he or she may set the exposure time on a timer which measures the time and automatically controls the exposure time to a set value. When, however, the distance between the light source and the printing paper surface and/or the diaphragm aperture of the projection lens are changed or the frame of the original film is replaced by another frame having a different average density, the condition of the enlarging optical system is renewed, and trial printings should be made again to find out a proper exposure time for the renewed state of the enlarging optical system.

In enlarging a color photograph, color balance or distribution of the light emitted from the light source and entering the original film should be taken into consideration. In the case of printing with a conventional small-sized color photographic enlarger, the trial printings are made by the operator changing the printing conditions until the condition for obtaining a best print is found for a picture frame of an original film (hereinafter referred to as "the best print condition"). Then, with the enlarger set to the best print condition, the light transmitted through the original film is measured and memorized in, for example, a so-called negative color analyzer for determining data of the exposure amount with respect to each of three primary colors. Then the original film is replaced by another film and the printing conditions such as the quantity of light emission from the light source and the color balance are relatively adjusted in accordance with the indication of the original color analyzer which memorizes the best print conditions. After the adjustment, actual printing operation is carried out. In such a device, however, the operational process from the trial printing to the actual printing operation is so complicated that the device might be erroneously operated. Further, in a case where the condition of the enlarging optical system is changed from the best print condition, e.g., when the size of the diaphragm aperture of the projection optical system is changed or the enlarging magnification is changed, such a complicated process must again be repeated from the trial printing for finding out the best print condition for a standard original film or otherwise the printing conditions are calculated by the operator as a function of the changes in the enlarging optical system.

The color analyzer for the photographic enlarger of the aforementioned type is used in the manner that after the best print conditions established in the trial printing operation are memorized, the condition of the light source in actual printing operation is manually adjusted by the operator who confirms whether the adjusted conditions are conformed to the memorized conditions or not by observing a display of the analyzer. Thus, operation of the analyzer in a darkroom is also complicated and inconvenient and such an analyzer can not provide any suitable solution to the problem of complexity of the printing operation when the condition of the enlarging optical system is changed.

In a processing laboratory using a large-sized photographic enlarger for mass production, a printing condition with which best prints are generally obtained is previously set in the enlarger and then the light transmitted through the film is measured by an original color analyzer which calculates the condition of the light source for its light emission. The data thus calculated are stored in a magnetic recording tape so that exposure is made on printing papers with the light source being controlled on the basis of the data provided from the magnetic recording tape. However, said generally predetermined best print condition is set on the premise that the enlarging optical system such as the enlarging magnification is not changed, and the device cannot cope with changes in the enlarging optical system. If the device is to be so constructed as to meet said changes, the construction thereof will be more complicated.

The aforementioned conventional photographic enlargers are further disadvantageous in that intensity of light to be emitted from the light source must be set constant similarly at the time of the trial printing operation and at the time of actual printing, requiring careful maintenance of the light source.

SUMMARY OF THE INVENTION

An object of the present invention is to provide a light measuring and printing condition data calculating device for use in a photographic enlarger which device can provide, with simple operation, data of printing conditions for obtaining a best print even when an optical condition is changed.

Another object of the present invention is to provide a photographic enlarger in which a light source is automatically controlled to provide best prints under various enlarging optical states with a simple operation once a best print condition for the enlarging optical system is established.

A further object of the present invention is to provide a light measuring and printing data calculating device for use in a color photographic enlarger which device can provide proper information of printing conditions with respect to various enlarging conditions of the optical system in the color photographic enlarger in which lights of three primary colors are emitted from separate light sources.

A still further object of the present invention is to provide a method of obtaining information of proper printing conditions regardless of the condition of the enlarging optical system without necessity for repeated trial printing operation for each optical condition.

For attaining the aforementioned objects, the device according to the present invention comprises a means for establishing data of the amount of light to be emitted from a light source for obtaining a best print in a desired state of an enlarging optical system, a light emitting means for emitting a predetermined amount of light from the light source of the photographic enlarger or other light emitting means, an emitted light quantity detecting circuit for directly detecting the quantity of light emission from the light source or said other light emitting means and producing output data commensurate with the detected quantity, an exposure amount detecting circuit for detecting the amount of the light emitted from the light source or said other light emitting means, at the position of a printing paper on an exposure surface through the enlarging optical system and producing output data commensurate with the detected amount and a calculating means for calculating data of the proper amount of the light to be emitted from the photographic enlarger in a changed condition of the enlarging optical system, from the comparison of output data from the emitted light quantity detecting circuit and the output data from the exposure amount detecting circuit and from the data of the exposure for providing a best print under a test condition and the result of the calculation being displayed or utilized for the control of the light emission from the light source of the photographic enlarger under the changed condition.

An embodiment of the present invention provides a device for measuring and calculating an amount of light to be emitted for photographic printing in a photographic enlarger which has a flash light source, the light amount of which can be controlled, and an optical system for projecting an enlarged picture image of an original negative or positive film onto a surface of an easel on which a printing paper is placed. The device comprises first light detecting means for directly detecting the amount of light emitted from the flash light source to generate a first output representing the amount of the flash light, second light detecting means for detecting the amount of exposure light coming from the flash light source through the film and the optical system and received at a position of the surface of the easel to generate a second output representing the amount of the exposure light, setting means for manually setting a preliminary desired amount of light to be emitted from the flash light source and operational means for calculating an actually desired amount of flash light to be emitted from the flash light source for obtaining a desired total amount of the exposure light on the surface of the easel for an exposure on the printing paper on the basis of the ratio of the first output data to the second output data as well as the data of the preliminary desired amount.

It is noted that the term exposure plane used herein corresponds to the surface of an easel on which a printing paper is placed.

PRINCIPLE OF THE PRESENT INVENTION

In advance of explaining the embodiments of the present invention in detail, a description is made herein on the principle of the data determination of the quantity of light emitted from the light source of the photographic enlarger.

The explanation will be made with respect to the case where the light measuring and printing condition calculating device according to the present invention is incorporated in a photographic enlarger with the light source of the enlarger also being used as the light emitting means for the light measurement. The device according to the present invention comprises a source light detecting circuit source which directly receives and measures the light emitted from the light source of the photographic enlarger and integrates the light measurement output, and an exposure amount detecting circuit which receives and measures, through the enlarging optical system and an original film, the light emitted from the light source of the photographic enlarger, the light measurement and reception being made at the position of a printing paper of the photographic enlarger. The light measurement is integrated for obtaining data of the amount of exposure by the light from the light source. After the appropriate selection and establishment of the conditions of the enlarging optical system of the photographic enlarger, such as the projection lens of a desired focal length, the diaphragm aperture and the distance between the projection lens and the surface of the printing paper the original film to be printed is set in the photographic enlarger and trial printings are made several times with the exposure condition being changed. This trial printing operation is carried out until a desired best print condition is obtained while changing the quantity of the light emission from the light source. When the best print condition is obtained, the quantity Ft of light emission from the light source at the best print condition is manually set in a setting device.

Then a predetermined amount of light (not necessarily corresponding to the light emission quantity at the time of exposure of the printing paper) is emitted from the light source and a calculation of the formula (1) (below) is performed with a datum $Mm_1$ representative of the value of the detected light emission quantity obtained from the light emission quantity detecting circuit and a datum $E_1$ representative of the output of the detected exposure amount obtained from the exposure amount detecting circuit and a datum Ft representative of the light emission quantity as set.

$$Et = Ft \times (E_1/Mm_1) \qquad (1)$$

In the calculation of the above formula (1), since the values Ft and $E_1/Mm_1$ respectively represent the proper light emission quantity and comparison of the quantity of light emission from the light source and the exposure amount of the printing paper in a first state of the enlarging optical system, the calculated value Et represents a datum of the exposure amount for obtaining the best print.

Then the diaphragm aperture and the enlarging magnification are changed to a second state of the enlarging optical system and a predetermined amount of light is emitted from the light source whereupon the emitted light amount is detected directly and through the enlarging optical system to obtain, for the new condition of the enlarging optical system, a datum $Mm_2$ of the detected light emission quantity output from the light emission quantity detecting circuit and a datum $E_2$ of the detected exposure amount output from the exposure amount detecting circuit. Then, with the obtained data $Mm_2$ and $E_2$ and said calculated data Et of the exposure amount, another calculation is made in accordance with the following formula (2):

$$Ft' = Et \times (Mm_2/E_2) \qquad (2)$$

In the above formula (2), the fractional relation between the detected light emission quantity datum and the detected exposure amount datum within the parenthesis is inverted, and the calculated value Ft' represents a datum of the quantity of light emission from the light source required for obtaining the proper exposure amount Et in the second state of the enlarging optical system.

Many other features, advantages and additional objects of the present invention will become manifest to those versed in the art upon reading following detailed description with reference to the accompanying drawings, wherein:

DESCRIPTION OF THE PREFERRED EMBODIMENTS

Figure 1:
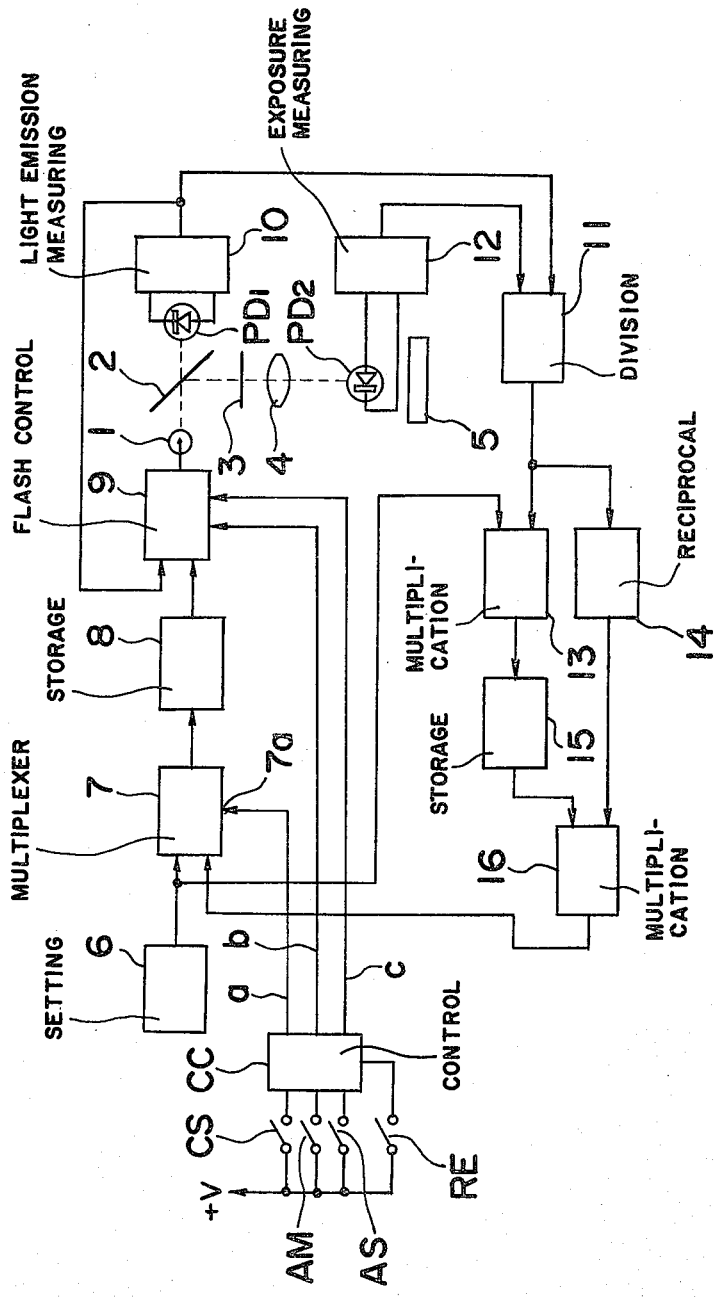
FIG. 1 is a block circuit diagram of an embodiment of a light measuring and control data calculating device for a photographic enlarger according to the present invention.

FIG. 1 shows a block diagram of an embodiment of a light measuring and control data calculation device for a photographic enlarger according to the present invention.

A xenon flash tube 1 is provided as a light source for a photographic enlarger (not shown), to emit light which is reflected by a reflective mirror 2 to an original film 3 and projection lens. A part of the emitted light passes through a half-mirror portion of the reflective mirror 2 to be received by a photoelectric element $PD_1$ while the light reflected by the reflective mirror 2 traverses the film 3 and is projected by a projection lens 4 onto a printing paper (not shown) which is placed on an easel 5 or an exposure plane to form an image on the film 3. Another photoelectric element $PD_2$ is located, prior to an actual printing operation, at a position on the easel 5 where a printing paper is to be placed for receiving the emitted light.

A setting device 6 is adapted to manually set a quantity of flash light Ft to be emitted by the flash tube 1 and an output terminal of the setting device 6 is connected to one input terminal of a multiplexer 7. The flash light quantity to be set should be such as to be expected by the user to provide a best print. The other input terminal of the multiplexer 7 is connected with an output terminal of a multiplication circuit 16 for effecting the calculation given by the aforementioned formula (2), which is hereinafter described in detail, while a selection terminal 7a of the multiplexer 7 is connected with an output terminal a of a control circuit CC which is also described in detail hereinafter. The multiplexer 7 is switched by a signal received at the selection terminal 7a, so as to generate an output datum set in the setting device 6 when the selection terminal 7a is at a low level while generating an output datum of the multiplication circuit 16 when the selection terminal 7a is at a high level. The output terminal of the multiplexer 7 is connected to an input terminal of a storage device 8, the output terminal of which is connected to a first input terminal of a flash control circuit 9. The storage device 8 is adapted to store the output datum of the setting device 6 or the multiplication circuit 16 fed through the multiplexer 7. The storage device 8 further functions to output the datum of the setting device 6 selectively in the original form or in a form being increased or decreased at a predetermined rate as hereinafter described at the time of the trial printing operation. If the preset flash quantity proves to be unsatisfactory for obtaining the best print as a result of the trial printing operation, a new flash light quantity that provided a best print in the trial printing may be set on the setting device 6. Second and third input terminals of the flash control circuit 9 are respectively connected with output terminals b and c of the control circuit CC and a fourth input terminal of the flash control circuit 9 is connected with an output terminal of a flash light quantity detecting circuit 10 which measure the quantity or amount of the light from the flash tube while an output terminal of the flash control circuit 9 is connected to the flash tube 1. The flash control circuit 9 generates a signal for initiating the firing of the flash tube 1 upon receiving a flash trigger signal from the control circuit CC while generating a signal for stopping the firing of the flash tube 1 when the output of the flash light quantity detecting circuit 10 reaches the value of the flash quantity data stored in the storage device 8 corresponding to the predetermined flash quantity value Ft set in the setting device 6.

The photoelectric element $PD_1$ which receives the light emitted from the flash tube 1 through the half-mirror portion of the reflective mirror 2 is connected between input terminals of the flash light quantity detecting circuit 10, the output terminal of which is in turn connected to the fourth input terminal of the flash control circuit 9 as well as to one input terminal of a division circuit 11. The flash light quantity detecting circuit 10 functions to integrate photoelectric current produced by the photoelectric element $PD_1$ and generates a signal M as a function of the integration which corresponds to the amount of the flash light emitted from the flash tube 1 until the light emission of the latter is stopped. The signal M is applied to the flash control circuit 9 and the division circuit 11.

The photoelectric element $PD_2$ is connected to an exposure amount detecting circuit 12, the output terminal of which is connected to the other input terminal of the division circuit 11. The exposure amount detecting circuit 12 functions to integrate photoelectric current generated from the photoelectric element $PD_2$ to generate a signal E as a function of the integration and representing the amount of light incident on the surface of the easel 5 on which the printing paper is to be put. The signal E is applied to the division circuit 11. The division circuit 11 conducts a division of the exposure amount signal E by the flash light quantity signal M of the flash tube 1 to generate a signal representing the quotient E/M.

The output terminal of the division circuit 11 is connected to one input terminal of a multiplication circuit 13 for performing the calculation of the formula (1), and also connected to an input terminal of a reciprocal circuit 14. The other input terminal of the multiplication circuit 13 is connected with the output terminal of the setting device 6 while the output terminal of the multiplication circuit 13 is connected to an input terminal of a storage device 15, the output terminal of which is connected to one input terminal of a multiplication circuit 16. The multiplication circuit 13 conducts multiplication of the output E/M of the division circuit 11 by the output Ft of the setting device 6, i.e., calculation of the aforementioned formula (1), and the storage device 15 functions to store the result of the calculation. That is, the storage device 15 stores the exposure amount datum Et of the output of the multiplication circuit 13, and outputs the same to the multiplication circuit 16. The storage device 15 also generates another exposure amount datum Et' for obtaining another best print with a printing paper having different sensitivity from that of the printing paper which is printed with the exposure amount data for obtaining the best print. To this end, the storage device 15 includes means for changing or adjusting its output in accordance with a set sensitivity of the printing paper being used or the difference of the sensitivity of the used printing paper and a standard one.

The reciprocal circuit 14 conducts reciprocal conversion of the output of the division circuit 11 representative of a quotient $E_2/Mm_2$ of division of an output $E_2$ from the flash light quantity detecting circuit 10 by an output $Mm_2$ from the exposure amount detecting circuit 12 wherein $E_2$ and $Mm_2$ are the values measured when the flash tube 1 is fired for a predetermined period of time with the optical system of the photographic enlarger adjusted in a condition for actual printing operation. The other input terminal of the multiplication circuit 16 is connected with the output terminal of the reciprocal circuit 14 while the output terminal of the multiplication circuit 16 is connected to the other input terminal of the multiplexer 7. The multiplication circuit 16 conducts multiplication of the output Et of the storage device 15 by the output of the reciprocal circuit 14, i.e., calculation of the aforementioned formula (2) to generate a flash light quantity datum Ft' for obtaining the best print in actual printing operation, which is input into the multiplexer 7.

Between the input terminal of the control circuit CC and a positive terminal (+V) of a power source, a control switch CS, an analyze memory switch AM, an analyze start switch AS and a reset switch RE are connected in parallel with one another to the output terminals of the control circuit CC respectively. When the control switch CS is closed, the control circuit CC generates a flash start signal at its terminal c. In this case, the terminal a is at a low level and the multiplexer 7 outputs the flash quantity datum Ft manually set in the setting device 6. Upon closure of the analyze start switch AS, the control circuit CC generates, from the terminal c, a light measurement flash start signal for initiating the flash firing of a given amount. Upon closure of the analyze memory switch AM, the control circuit CC also generates from the terminal b a flash start signal for initiating the flash firing of a given amount. The terminal a is inverted to a high level after a lapse of a predetermined period of time from the starting of the flash firing, so that the multiplexer 7 outputs the flash quantity datum Ft' received from the multiplication circuit 16. The terminal a is again inverted to a low level upon closure of the reset switch RE, so that the multiplexer 7 again outputs the datum Ft representing the set flash quantity received from the setting device 6.

OPERATION

In a trial printing operation, the control switch CS is closed to generate the flash start signal from the terminal c thereof, so that the multiplexer 7 outputs the flash quantity datum Ft manually set in the setting device 6.

Figure 2:
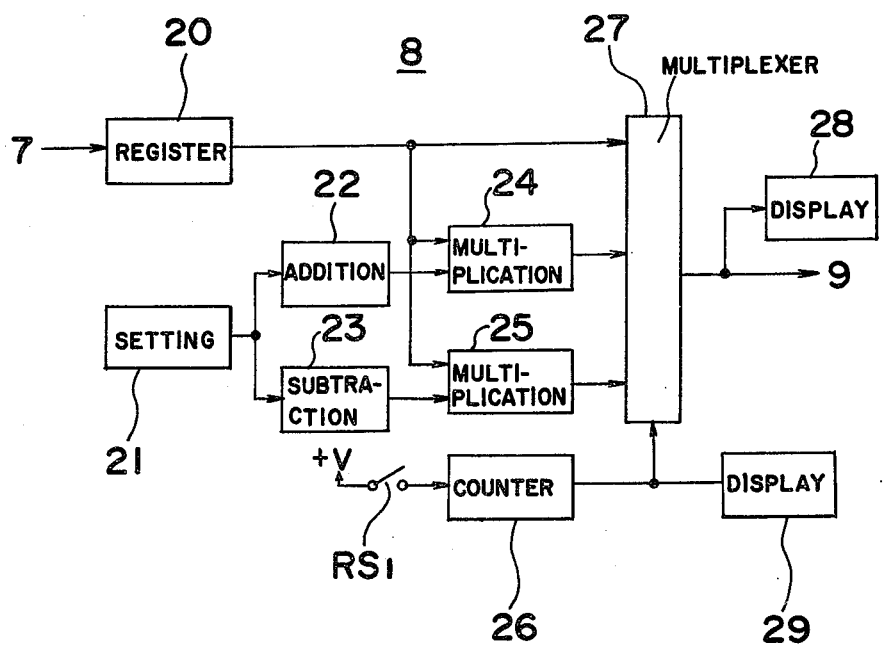
FIG. 2 is a detailed block circuit diagram of a storage device 8 shown in FIG. 1.

The flash quantity datum Ft thus output from the multiplexer 7 is received by the storage device 8, which is shown in FIG. 2 in detail.

In FIG. 2, the flash quantity datum Ft generated from the multiplexer 7 is received by a register 20. In a manual setting device 21 is manually set a constant k for determining a rate of increasing or decreasing the flash quantity datum Ft. The constant k may have a value of, e.g., 0.1, 0.2, 0.3, 0.4 or 0.5. The datum generated from the manual setting device 21 is received by an addition circuit 22 and a subtraction circuit 23, which respectively output a datum $1+k$ and a datum $1-k$. A pair of multiplication circuits 24 and 25 conduct multiplying operation $Ft \times (1+k)$ and multiplying operation $Ft \times (1-k)$ respectively. That is, the multiplication circuits 24 and 25 respectively generate a flash quantity datum which is slightly larger than the flash quantity datum Ft set in the setting device 6 and a flash quantity datum which is slightly smaller than said datum Ft.

The number of times of the closure of a selection switch $RS_1$ is counted by a ternary counter 26, which in turn outputs data "00", "01", "10" and "00" respectively corresponding to no time, one time, two times and three times of the closure of the selection switch $RS_1$. A multiplexer 27 alternatively outputs three flash quantity data from the register 20 and the multiplication circuits 24 and 25 in accordance with the aforementioned data of the ternary counter 26. For example, the multiplexer 27 generates the datum Ft from the register 20 when the ternary counter 26 outputs "00" and generates the datum $Ft \times (1+k)$ from the multiplication circuit 24 when the ternary counter 26 outputs "01" while generating the datum $Ft \times (1+k)$ when the ternary counter 26 outputs "10". The datum thus generated from the multiplexer 27 is displayed by a display device 28 while simultaneously being received by the flash control circuit 9 as shown in FIG. 1. The output from the ternary counter 26 is also input into a display device 29, which in turn displays which one of the register 20, the multiplication circuit 24 and the multiplication circuit 25 outputs the datum received from the multiplexer 27.

With the storage device 8 constructed as shown in FIG. 2, printing is conducted successively with the quantity of light being controlled to values in accordance with a set flash light quantity datum which is expected to provide substantially a best print, an overexposure datum which is slightly larger than the set datum and an underexposure datum which is slightly smaller than the set datum to enable the selection, from three printing results, of the one which is considered the nearest to the best print, whereby the selected datum may be set in the setting device 6 as a flash quantity datum for the best print. Since, in this case, the display device 29 displays which datum has been selected for the flash light quantity control, the operator can easily know and select the amount of exposure. For example, he or she may conduct a printing operation after operating the selection switch $RS_1$ until the underexposure datum is displayed in the display device 29 when the operator wishes to decrease the exposure amount for a comparison of the printing results. Thus, the operator can easily reach a best print obtaining condition. The manual setting device 21 may be replaced by a fixed datum output device which outputs a fixed datum of, e.g., 0.3.

The flash control circuit 9 controls the amount of the emitted light from the flash tube 1 according to one of the flash quantity data Ft, $Ft\times(1+k)$ or $Ft\times(1-k)$ fed from the multiplexer 27 and the storage device 8. In this case, the flash tube 1 performs short-time flash firing a plurality of times such that the firing operation is stopped when the quantity of the light emitted from the flash tube 1, in total, substantially reaches said one of the flash quantity data Ft, $Ft\times(1+k)$ or $Ft\times(1-k)$.

When, for example, the set flash quantity datum is Ft, the flash tube 1 is fired a plurality of times to emit, at each time, a unit quantity of light commensurate with a unit flash quantity datum $f_1 = Ft/16$ which is obtained by shifting the set flash quantity datum Ft by four bits. Then detected flash quantity data $M_{1i}$ (i=1, 2, ...) provided from the circuit 10 are successively subtracted from the set flash quantity datum Ft per each flash firing as shown by the following formulas (3), (4), ... (5), wherein l represents an integer:

$$Ft - M_{11} = Ft_{11} \quad (3)$$
$$Ft_{11} - M_{12} = Ft_{12} \quad (4)$$
$$Ft_{1(l-1)} - M_{1l} = Ft_{1l} \quad (5)$$

When the value $Ft_{1l}$ is less than half of the set flash quantity datum Ft, i.e., when $Ft_{1l} < 8 \cdot f_1 = [Ft/2]$, the flash tube 1 is fired a plurality of times to emit, at each time, a half unit quantity of light commensurate with a datum $f_2 = [f_1/2]$ obtained by shifting the aforementioned datum $f_1$ by one bit, conducting per each flash the following calculations, wherein k represents an integer:

$$Ft_{1l} - M_{21} = Ft_{21}$$
$$Ft_{21} - M_{22} = Ft_{22}$$
$$\vdots$$
$$Ft_{2(k-1)} - M_{2k} = FT_{2k}$$

When the value $Ft_{2k}$ is less than the value $2 \cdot f_2$, i.e., when $FT_{2k} < 2 \cdot f_2$, the flash tube 1 is further fired a plurality of times to emit, at each time, a quarter unit quantity of light commensurate with a unit flash quantity datum $f_3 = [f_2/2]$ which is obtained by shifting the datum $f_2$ by one bit, conducting per each flash firing the following calculations, wherein m represents an integer:

$$Ft_{2k} - M_{31} = Ft_{31}$$
$$Ft_{31} - M_{32} = Ft_{32}$$
$$\vdots$$
$$Ft_{3(m-1)} - M_{3m} = Ft_{3m}$$

When the value $Ft_{3m}$ is less than or equal to zero, i.e., $Ft_{3m} = 0$, pulsative firing of the flash tube 1 is stopped. In a case where the flash tube 1 is fired in the quarter unit flash quantity $f_3$, the ratio of the quarter unit flash quantity $f_3$ to the set flash quantity Ft is:

$$f_3/Ft \leq 1/64 = 1.56\%$$

Thus, the deviation of the actual quantity of light from the expected value is less than 2% at the most, that is, less than 1 cc in the unit (cc) indicating the flash quantity of a color photographic enlarger. Additionally, even if the amount of the light emitted from the flash tube per each time varies with the flash device, the error in total amount of emitted light is negligible, because the amount of emitted light is measured and metered as described above.

Figure 3:
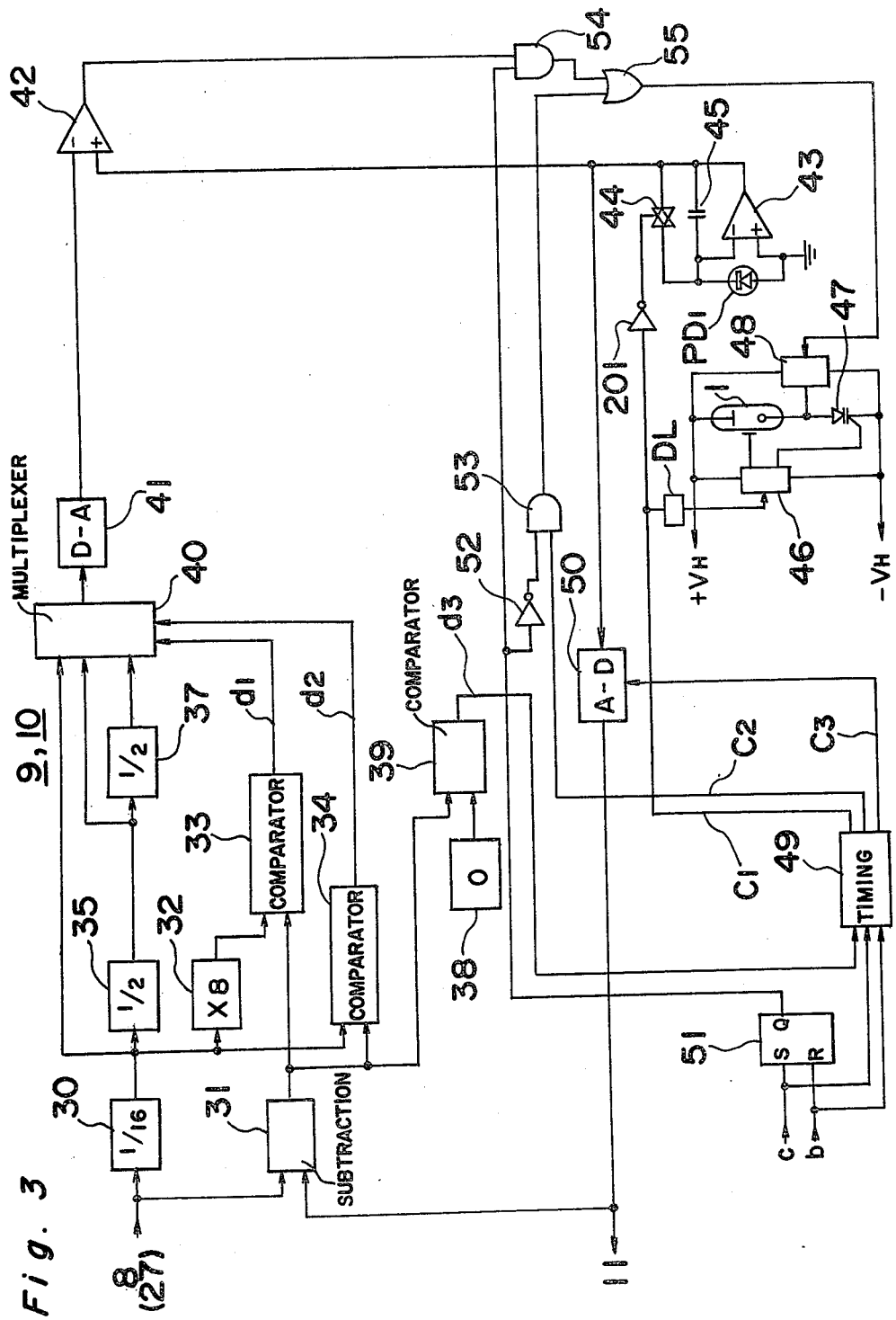
FIG. 3 is a detailed block circuit diagram of a flash control circuit 9 and a flash quantity detecting circuit 10 shown in FIG. 1.

FIG. 3 shows a detailed circuit arrangement of the flash control circuit 9 and the flash quantity detecting circuit 10. One of the flash quantity data Ft set by the setting device 6, $Ft\times(1+k)$ or $Ft\times(1-k)$ output from the storage device 8 as shown in FIG. 1 is input into a shift circuit 30, which generates a unit flash quantity datum $F_1 = [Ft]/16$ for the set flash quantity datum Ft. The unit flash quantity datum $F_1$ is received by shift circuits 32 and 35, a comparator 34 and a multiplexer 40 respectively. The output from the shift circuit 35 is received by a shift circuit 37 and a multiplexer 40 while the output from the shift circuit 37 is also received by the multiplexer 40. The shift circuit 35 outputs a datum $f_2 = f_1/2$ and the shift circuit 37 outputs a datum $f_3 = f_2/2$. The shift circuit 32 outputs a datum of 8 $f_1$, i.e., Ft/2 while a subtraction circuit 31 outputs a datum of subtraction of the detected value M of the flash quantity of the flash tube 1 as detected by the photoelectric element $PD_1$, from the set flash quantity datum Ft. A zero datum output circuit 38 outputs a datum of "0" which is equal to the output of the subtraction circuit 31 at the time when the result of the subtraction is "0". Three digital comparators 33, 34 and 39 respectively receive at their one input terminals the output from the subtraction circuit 31 while receiving at the other input terminals the outputs from the shift circuit 30, the shift circuit 32 and the zero datum output circuit 38 respectively to determine whether the aforementioned subtracted datum is more or is less than the values $8 \cdot f_1$, $2 \cdot f_2$ and zero respectively.

When the flash start signal is applied via the input terminal C upon closure of the control switch CS of the control circuit CC, a flip-flop 51 is set to produce a high level signal at the terminal Q. This high level signal is applied to an AND circuit 54 to enable or unblock the AND circuit 54 while the high level signal is inverted by an inverter 52, thereby disabling or unblocking an AND circuit 53. The flash start signal is also received by a timing circuit 49, which generates a high level signal from its output terminal $C_1$. After a lapse of a predetermined period of time from the generation of the high level signal from the output terminal $C_1$, a delay circuit DL produces a high level signal, by which a trigger circuit 46 is driven to trigger the firing of the flash tube 1. The high level signal at the terminal $C_1$ is inverted by an inverter 201 and applied to an analog switch 44, which is turned off by a low level signal from the inverter 201, so that an integrating capacitor 45 starts integration of the photoelectric current fed from the photoelectric element $PD_1$ which receives the flash light of the flash tube 1. In this case immediately after firing of the flash tube 1 is started, output terminals $d_1$, $d_2$ and $d_3$ of the comparators 33, 34 and 39 are all at low levels, and therefore the inputs to the multiplexer 40 for controlling the same are at low levels. Thus, the multiplexer 40 outputs the datum of the unit flash light quantity $f_1$ received from the shift circuit 30. Then the datum $f_1$ is converted by a digital-to-analog converter 41 into an analog signal, which is applied to a comparator 42 to be compared with a flash light quantity detection signal generated from the integrating capacitor 45. When the level of said flash light quantity detection signal exceeds that of said analog signal from the digital-to-analog converter 41, the output of the comparator 42 is inverted to a high level which is transmitted through the AND circuit 54 and an OR circuit 55 to a known flash stop circuit 48 to stop firing of the flash tube 1.

After a lapse of a predetermined period which is sufficient for covering the time from the generation of the flash start signal to the completion of full firing of the flash tube 1, a timing circuit 49 generates at its output terminal $C_3$ a pulse which activates an analog-to-digital converter 50 to perform analog-to-digital conversion of the flash quantity detection signal generated from the integrating capacitor 45. A flash quantity detection datum $M_{11}$ thus digitized is subjected to the following calculation by the subtraction circuit 31:

$$Ft - M_{11} = Ft_{11}$$

Then the comparator 33 compares the output $Ft_{11}$ from the subtraction circuit 31 with the output $8 \cdot f_1$ from the shift circuit 32. The flash start signal remains at a high level until the completion of said analog-to-digital conversion in the analog-to-digital converter 50, during which the analog switch 44 is blocked to maintain the datum of the integrating capacitor 45. After completion of the analog-to-digital conversion, the flash start signal is inverted to a low level so that the analog switch 44 is turned on to reset the datum of the integrating capacitor 45. After a lapse of a predetermined period of time from the completion of said analog-to-digital conversion, the timing circuit 49 again generates, at the output terminal $C_1$, a flash start signal to repeat a similar operation. When a datum $Ft_1$ is less than the datum $8 \cdot f_1 (Ft_{1l} < 8 \cdot f_1)$, the output terminal $d_1$ of the comparator 33 is inverted to a high level so that the multiplexer 40 outputs a datum $f_2 = [f_1/2]$ received from the shift circuit 35. The datum $f_2$ is converted into an analog signal by the digital-to-analog converter 41 and is input to the comparator 42, and thereafter the unit flash quantity of the flash tube 1 is controlled per the datum $f_2$. When a datum $Ft_{2k}$ generated by the subtraction circuit 31 which is the remainder of successive subtraction of the detected flash quantity from the set flash quantity is less than the datum $2 \cdot f_2 (Ft_{2k} < 2 \cdot f_2)$, the output terminal $d_2$ of the comparator 34 is inverted to a high level with the terminal $d_1$ also inverted to a high level, so that the multiplexer 40 generates a datum $f_3 = f_2/2$ applied from the shift circuit 37 to the digital-to-analog converter 41. Thus, the comparator 42 compares the datum $f_3$ with the output of the integrating circuit 43. Then, the quantity of the flash light can be controlled under the datum $f_3$ basis. When an output $Ft_{3m}$ from the subtraction circuit 31 is less than or equal to zero ($Ft_{3m} < 0$), the output terminal $d_3$ of the comparator 39 is inverted to a high level to stop operation of the timing circuit 49, so that the flash start signal is not generated from the terminal $C_1$ thereafter.

Explanation is now made on the operation for memorizing the state of the optical system of the enlarger under which a best print has been obtained by the aforementioned trial printing operation (hereinafter referred to as "analyze memory operation").

Referring to FIGS. 1, 2 and 3, the flash light quantity which provided the best print is manually set in the setting device 6 while the selection switch $RS_1$ is closed an appropriate number of times so that the storage device 8 outputs the flash light quantity datum of the setting device 6 as it is. When an analyze memory switch AM is closed with the optical system being left in the best print condition, the output terminal b of the control circuit CC is inverted to a high level to reset the flip-flop 51. Thus, the output of the inverter 52 is inverted to a high level to enable the AND circuit 53. The output terminal $C_1$ of the timing circuit 49 generates a flash start signal to initiate the firing of the flash tube 1. Then the division circuit 11 receives the flash quantity detection datum $Mm_1$ of the flash tube 1 obtained by conversion of an integration of the output current of the photoelectric element $PD_1$ into a digital signal by the analog-to-digital converter 50 and a detected datum $E_1$ of the exposure amount obtained by analog-to-digital conversion of an integration of the output current from the photoelectric element $PD_2$ corresponding to the amount of the exposure at the position of the printing paper on the surface of the easel 5 by the light of the flash tube 1 so as to conduct the calculation of $E_1/Mm_1$.

Then the multiplication circuit 13 conducts the calculation $Et = Ft \times (E_1/Mm_1)$, whereupon the result Et of this calculation is input into the storage device 15 and stored therein. The value Ft represents the set flash light quantity for the best print obtained by the trial printing operation while the value Et represents the exposure amount at the position of the printing paper on the surface of the easel 5 when the flash tube 1 emits the quantity Ft of flash light for obtaining the best print. Therefore, with utilization of a printing paper which has the same sensitivity as the printing paper with which the best print has been obtained, even in a case where the quantity of the flash light emitted from the flash tube 1 is changed, the best print can be obtained by adjusting the state of the optical system including the original film such that the exposure amount at the position on the surface of the easel 5 reaches the value Et. Further, in a case where the optical system is optionally changed, the best print can be obtained by changing the flash quantity of the flash tube 1 such that the exposure amount on the surface of the easel 5 reaches the value Et. That is, the exposure amount Et corresponds to the sensitivity of the printing paper.

After a lapse of a predetermined period of time, another output terminal $C_2$ of the timing circuit 49 generates a flash stop signal, which is transmitted through the AND circuit 53 and the OR circuit 55 to the flash stop circuit 48, so as to stop flash firing of the flash tube 1.

With a printing paper having a different sensitivity from that of the printing paper with which the best print was obtained, a best print can still be obtained without the necessity of trial printing by correcting the exposure amount datum Et in accordance with the difference in sensitivity of the two printing papers.

Figure 4:
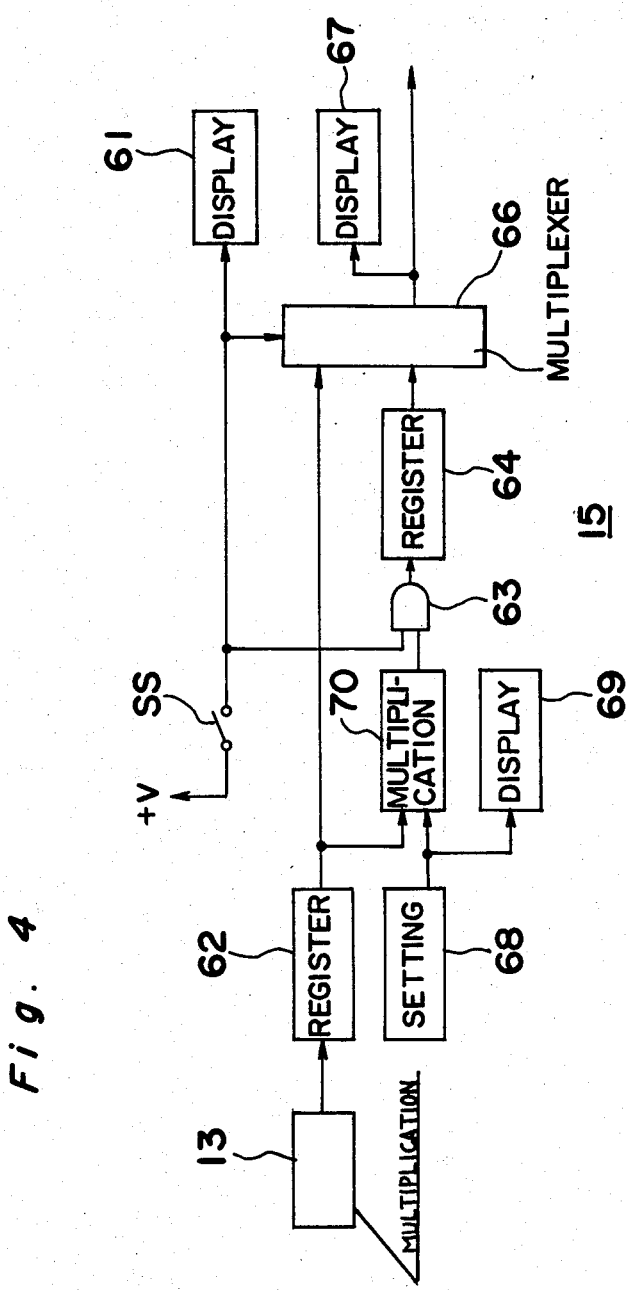
FIG. 4 is a detailed block circuit diagram of a storage device 15 in FIG. 1.

FIG. 4 shows the circuit arrangement for performing such compensation for the difference of the sensitivity of printing papers. The circuit of FIG. 4 shows a detailed example of the storage device 15 of FIG. 1. The exposure amount datum Et generated from the multiplication circuit 13 (FIG. 1) is set in a register 62. Difference in sensitivity between the printing paper with which the best print was obtained and another printing paper to be used is manually set in a setting device 68. The difference value thus set in the setting device 68 is displayed by a display device 69 as well as multiplied by the exposure amount datum Et stored in the register 62 in a multiplication circuit 70, which calculates an exposure amount datum Et' for obtaining a best print for the new printing paper having another sensitivity. The exposure amount datum Et' thus calculated is fed to a register 64 through an AND circuit 63 and stored therein, and the AND circuit 63 is enabled by the closure of a switch SS as hereinafter described.

The exposure amount data Et and Et' are both input in a multiplexer 66, the selection terminal of which is connected to the switch SS, one terminal of which is connected to the positive terminal +V of the power source. The switch SS functions to select the output of the multiplication circuit 16 of FIG. 1 depending on the opening and closing thereof in such a manner that the multiplexer 66 generates the exposure amount datum Et received from the register 62 with the switch SS open while generating the exposure amount datum Et' through the register 64 with the switch SS closed. The display device 61 displays which exposure amount datum is selected by the switch SS while a display device 67 displays the exposure amount datum as generated from the multiplexer 66 and a display device 69 displays the value manually set in the setting device 68. The AND circuit 63 and the register 64 may be omitted from the circuit arrangement in this case.

The storage device 15 may, in addition to the function of the aforementioned storage of the exposure amount data corresponding to different sensitivities of the printing paper, store exposure amount data obtained by a plurality of light measuring operations for the best prints with respect to a plurality of desired portions of the region of the images to be printed such as the whole and a part or different portions. In the case of FIG. 4, two different kinds of light measurement can be effected, and the number "1" is set in the setting device 68. For memorizing, in the analyzing mode, the exposure amount datum obtained by the first light measurement, the switch SS is closed to enable the AND circuit 63. By virtue of this, the first exposure amount datum is stored in the register 64 in a first analyze memory operation. For memorizing, in the analyzing mode, the exposure amount datum obtained by the second light measurement, the switch SS is opened to disable the AND circuit 63. By virtue of this, the second exposure amount datum is stored in the register 62 in a second analyze memory.

Explanation is now made of the operation for calculating a flash light quantity for obtaining a best print in a condition after a film to be enlarged is set upon completion of the analyze memory operation and the state of the optical system including the diaphragm aperture and the enlarging magnification is desirably adjusted and before conducting actual printing operation (hereinafter referred to as "analyze start operation"). When an analyze start switch AS in FIG. 1 is closed, the output terminal b of the control circuit CC is again inverted to a high level to again fire the flash tube 1 for a predetermined period of time. Then the division circuit 11 performs a calculation of $E_2/Mm_2$ by dividing the output $Mm_2$ from the flash quantity detecting circuit 10 and the output $E_2$ from the exposure amount detecting circuit 12 while the reciprocal circuit 14 performs calculation of $Mm_2/E_2$. The division circuit 16 calculates, in accordance with the data from the reciprocal circuit 14 and the storage device 15, a new flash quantity datum Ft' by performing the following calculation:

$$Ft' = Et \times (Mm_2/E_2)$$

In this condition, the output terminal a of the control circuit CC is at a high level, whereby the flash quantity datum Ft' is transmitted to the storage device 8 through the multiplexer 7. The value Ft' represents the flash quantity with which the best print can be obtained for the following reason: The best print can be obtained with the exposure amount reaching the value Et, and since the division circuit 11 has measured the relation between the flash light quantity detection datum of the flash tube 1 and the exposure amount detection datum on the surface of the easel 5 when the state of the optical system is changed, for example, by exchanging the film or film frame or adjusting the diaphragm aperture and/or the enlarging magnification, it is deduced from the relation $Ft':Et = Mm_2:E_2$ that the value of the flash quantity datum for obtaining the best print is:

$$Ft' = Et \times (Mm_2/E_2)$$

Figure 5:
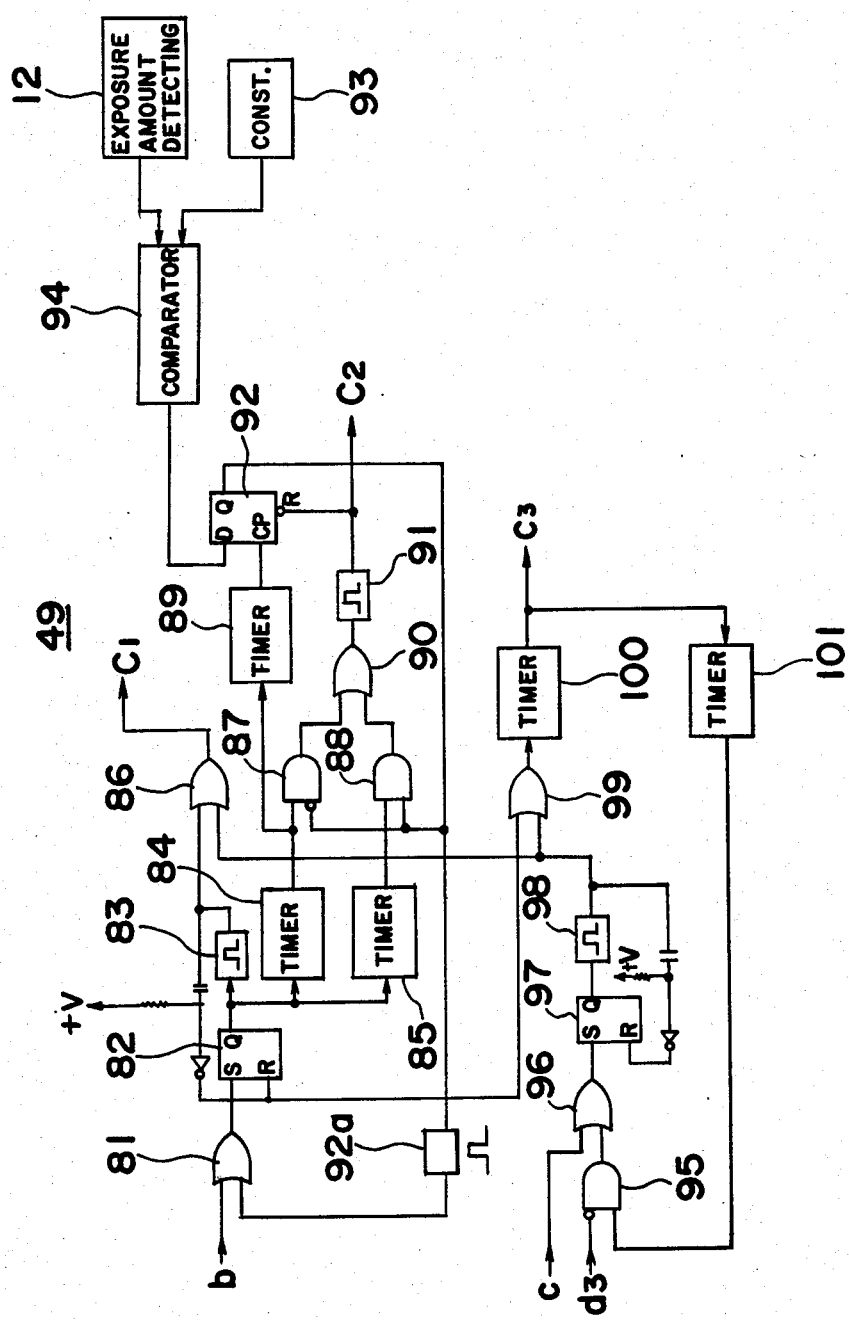
FIG. 5 is a detailed block circuit diagram of a timing circuit 49 shown in FIG. 3.

FIG. 5 is a block circuit diagram showing a definite example of the timing circuit 49 of FIG. 3. The timing circuit 49 functions to fire the flash tube 1 in the analyze memory operation and the analyze start operation. Additionally, when the flash quantity of the flash tube 1 is detected to be so small that the exposure amount detection circuit 12 is not normally operated, the timing circuit 49 also functions to again fire the flash tube 1 for a period longer than the first flash firing period for increasing the exposure amount output to ensure the normal operation of the exposure amount detection circuit 12.

When the terminal b of the control circuit CC (FIG. 1) is inverted to a high level, the output of an OR circuit 81 is raised to a high level to set a flip-flop 82, the Q output terminal of which is in turn raised so that a monostable multivibrator 83 outputs a pulse in response to a positive edge of the output of the OR circuit 81, whereby a flash start signal appears from an OR circuit 86 and is fed to the flash control circuit 9 through the terminal $C_1$ to start a light emitting operation of the flash tube 1 (FIG. 3). Upon the raising of the Q output terminal of the flip-flop 82, a pair of timers 84 and 85 for counting the flash firing period of the flash tube 1 simultaneously starts a time counting. The time set to be counted in the timer 84 is shorter than that set in the timer 85.

At the time when the terminal b is inverted to a high level, a D flip-flop 92 is reset and its Q output terminal is at a low level. Therefore, a pulse generated from the timer 84 by completion of time counting is transmitted through an AND circuit 87 and an OR circuit 90 to a monostable multivibrator 91, which generates a pulse toward the terminal $C_2$ as a signal to stop firing of the flash tube 1 (referred to as a firing completion signal). The time count completion pulse from the timer 84 is also transmitted to a timer 89, which in turn transmits the time count completion pulse to a clock terminal CP of the D flip-flop 92 after a lapse of a period required for converting the analog signal representing the exposure amount on the surface of the easel 5 fed from the exposure amount detection circuit 12 into a digital signal by the analog-to-digital counter (not shown). A comparator 94 is so constructed that the output thereof is at a high level when the output of the exposure amount detection circuit 12 (FIG. 1) is smaller than the output of a data setting circuit 93 upon completion of time counting at the timer 84. This high level signal is taken in the D flip-flop 92 to invert the Q output thereof to a high level. The output of the D flip-flop 92 is applied to the OR circuit 81 through a monostable circuit 92a. By virtue of this, the output of the OR circuit 81 is again raised to a high level, so that the monostable multivibrator 83 generates a flash start signal toward the terminal $C_1$. Since the Q output of the D flip-flop 92 is at a high level during the second flash firing, a time count completion signal generated from the timer circuit 85 is transmitted through the AND circuit 88 and the OR circuit 90 to the monostable multivibrator 91, which in turn generates a flash stop signal to the terminal $C_2$ to stop the firing of the flash tube 1, while the D flip-flop 92 is reset by the negative edge of the pulse from the monostable multivibrator 91, whereby the output of the OR circuit 81 is inverted to a low level so that the flash start signal is not generated thereafter. Since the time set in the timer 85 is longer than the time set in the timer 84 in the aforementioned manner, the flash light quantity of the flash tube 1 is increased to facilitate normal operation of the exposure amount detection circuit 12.

The flash start signal from the monostable multivibrator 83 is also transmitted through an OR circuit 99 to a timer 100, so that, after a period sufficient for completing full firing of the flash tube 1, a count completion pulse is generated to the terminal $C_3$ so an analog-to-digital converting operation is started at the analog-to-digital converter 50 shown in FIG. 3.

When the terminal C of the control circuit CC (FIG. 1) is inverted to a high level, the output of the OR circuit 96 is raised to a high level to set the flip-flop 97 so that a flash start pulse from the monostable multivibrator 98 is generated to the terminal $C_1$ through the OR circuit 86. Then the flash light quantity is controlled by the operation as explained with reference to the block circuit diagram of FIG. 3. The flash start pulse is transmitted to the timer 100 through the OR circuit 99, and after the aforementioned period defined by said timer 100, an analog-to-digital conversion start signal is generated from the terminal $C_3$. Further, after a period sufficient for the analog-to-digital conversion of the analog-to-digital converter 50, a timer 101 outputs a time count completion pulse. When, in this case, the output terminal $d_3$ of the comparator 39 (FIG. 3) is at a low level, i.e., the quantity of the light of the flash tube 1 has not yet completely reach the set value, the AND circuit 95 outputs the pulse to again set the flip-flop 97 through the OR circuit 96 for re-starting the flash operation. The operation described above is repeated until the flash light quantity reaches the set value. When the flash light quantity reaches the set value with the output of the comparator 39 (FIG. 3) inverted to a high level, the AND circuit 95 is closed so that the firing of the flash tube 1 is not performed thereafter.

Figure 6:
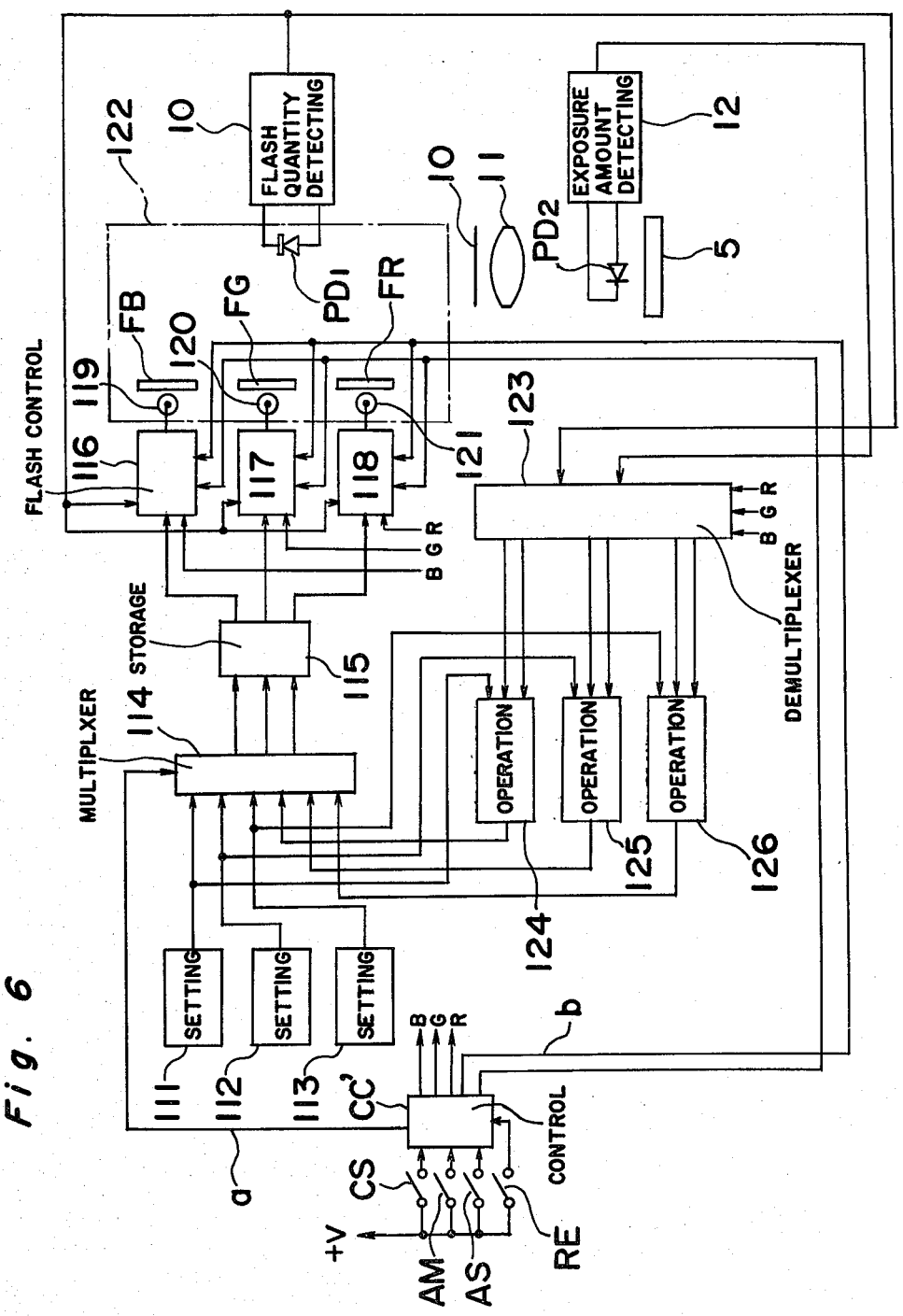
FIG. 6 is a block circuit diagram showing another embodiment of the light measuring and control data calculating device for a photographic enlarger according to the present invention.
Figures 7A, 7C:
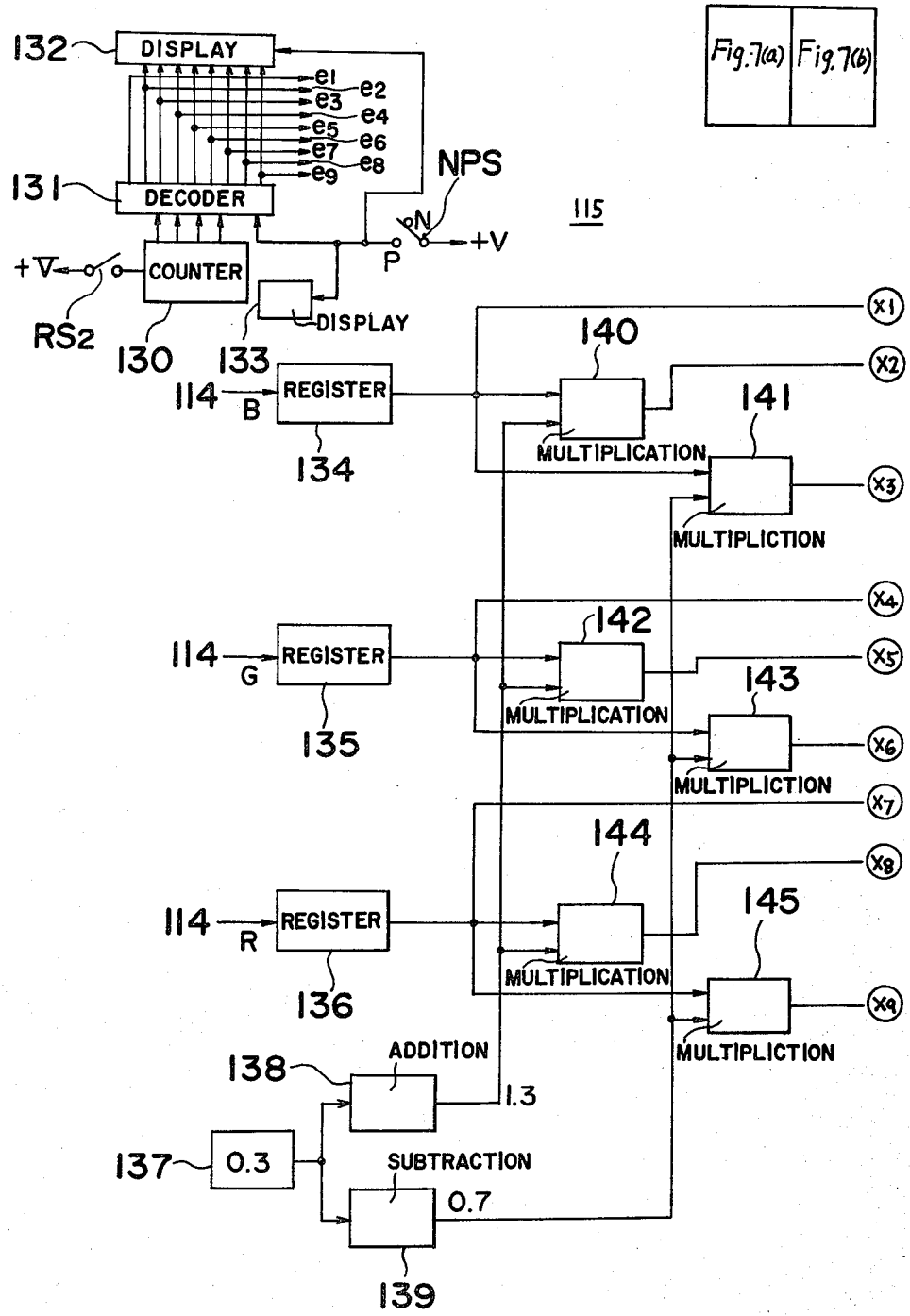
FIG. 7 is a detailed block circuit diagram of a storage device 115 shown in FIG. 6.
Figure 7B:
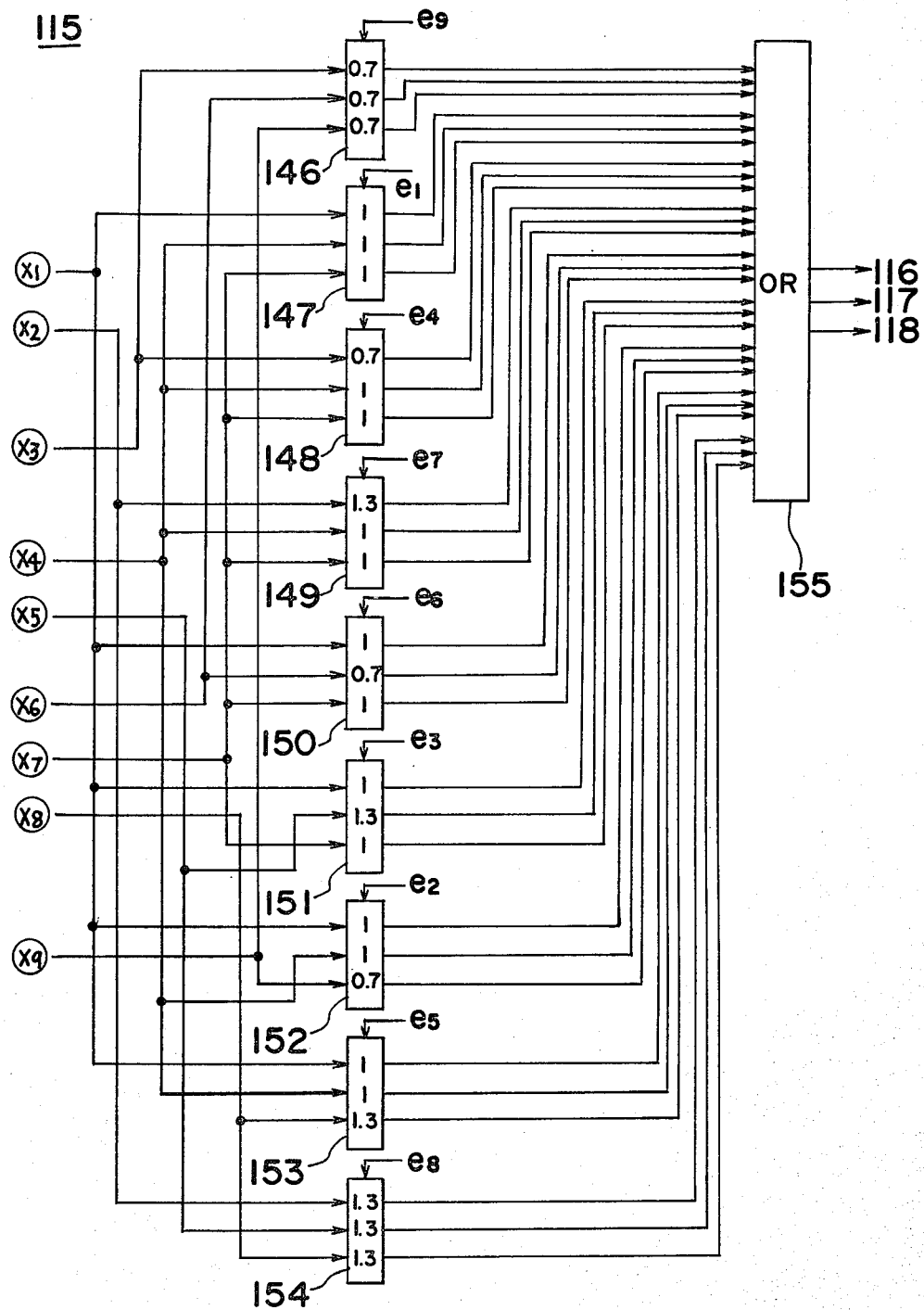

In FIG. 6, there is shown another embodiment of the device according to the present invention which is associated with a photographic color enlarger. This embodiment is basically formed of three identical circuits which are similar to the circuit arrangement shown in FIG. 1, respectively formed with respect to blue, green and red image printings. A setting device 111 is adapted for manually setting the flash quantity of the blue light and a setting device 112 is for setting the flash quantity of the green light while a setting device 113 is provided for setting the flash quantity of the red light. Operational circuits 124, 125 and 126 are adapted to calculate the flash quantities of the blue light, the green light and the red light respectively, and the detailed construction of each of the operational circuits 124, 125 and 126 is identical to the operational circuit arrangement shown in FIG. 1 formed of the division circuit 11, the multiplication circuit 13, the storage device 15, the reciprocal circuit 14 and the multiplication circuit 16. A multiplexer 114 is adapted to output data from the setting devices 111, 112 and 113 in a trial printing operation and data from the operational circuits 124, 125 and 126 in an actual printing operation. Numeral 115 indicates a storage device, the detail of which is shown in FIG. 7 as hereinafter described. A flash control circuit 116 facilitates firing of a flash tube 119 with a quantity corresponding to the quantity of blue flash light from the storage device 115 while a flash control circuit 117 functions to fire a flash tube 120 with a quantity corresponding to the quantity of green flash light and a flash quantity control circuit 118 enables firing of a flash tube 121 with a quantity corresponding to the quantity of red flash light. The detailed circuit arrangement of each of the flash control circuits 116, 117 and 118 is identical to that of the circuit shown in FIGS. 3 and 5. A light mixing box 122 as shown encircled by the one-dot chain line in FIG. 6 contains a blue-color filter FB, a green-color filter FG and a red-color filter FR and is adapted for uniform emission of the blue light, the green light and the red light respectively therefrom.

When a switch CS is closed for a printing operation, terminals B, G and R of a control circuit CC' successively generate flash start signals to successively fire the flash tubes 119, 120 and 121. The flash quantity at each of the flash tubes 119, 120 and 121 is controlled in a manner identical to that of the embodiment shown in FIG. 3. When the switch AM is closed for a analyze memory operation, the terminal B of the control circuit CC' is first inverted to a high level to fire the flash tube 119 with a predetermined quantity of light so that an output $Mmb_1$ obtained from the flash quantity detection circuit 10 at this time and an output $Eb_1$ of the exposure amount detection circuit 12 are input through a demultiplexer 123 to an operational circuit 124, which further receives an output Ftb of a setting device 111 for conducting a calculation of $(Eb_1/Mmb_1) \times Ftb = Etb$ so that an exposure amount datum Etb of blue is stored in a storage device (not shown) of the operational circuit 124. Then the terminal G of the control circuit CC' is inverted to a high level to fire the flash tube 120 with a predetermined quantity so that an output $Mmg_1$ of the flash light quantity detection circuit 10 and an output $Eg_1$ of the exposure amount detection circuit 12 are input through a demultiplexer 123 to an operational circuit 125, which in turn receives an output Ftg of the setting device 112 to conduct the calculation of $(Eg_1/Mmg_1) \times Ftg = Etg$ so that an exposure amount datum Etg for green is stored in a storage device (not shown) of the operational circuit 125. Thereafter the terminal R of the control circuit CC' is inverted to a high level to flash the flash tube 121 in a predetermined quantity so that an output $Mmr_1$ of the flash quantity detection circuit 10 and an output $Er_1$ of the exposure amount detection circuit 12 are input through a demultiplexer 123 to an operational circuit 126, which further receives an output Ftr for the setting device to conduct the calculation of $(Er_1/Mmr_1) \times Ftr = Etr$ so that an exposure amount datum Etr of red is stored in a storage device (not shown) of the operational circuit 126.

When the optical system of the photographic enlarger with which the circuit arrangement shown in FIG. 6 is associated is adjusted to a state for an actual printing operation and the switch AS is closed to start an analysis, the terminals B, G and R are successively inverted to a high level to successively fire the flash tubes 119, 120 and 121, so that calculations are conducted with outputs $Mmb_2$, $Mmg_2$ and $Mmr_2$ of the flash quantity detection circuit 10, outputs $Eb_2$, $Eg_2$ and $Er_2$ of the exposure amount detection circuit 12 and exposure amount data Etb, Etg and Etr stored in the respective storage device of the operational circuits 124, 125 and 126 as follows:

$Ft'b = Etb \times (Mmb_2/Eb_2)$ $Ft'g = Etg \times (Mmg_2/Eg_2)$ $Ft'r = Etr \times (Mmr_2/Er_2)$ and the calculated flash quantity data Ft'b, Ft'g and Ft'r are transmitted to the storage device 115 through the multiplexer 114.

Figure 8:
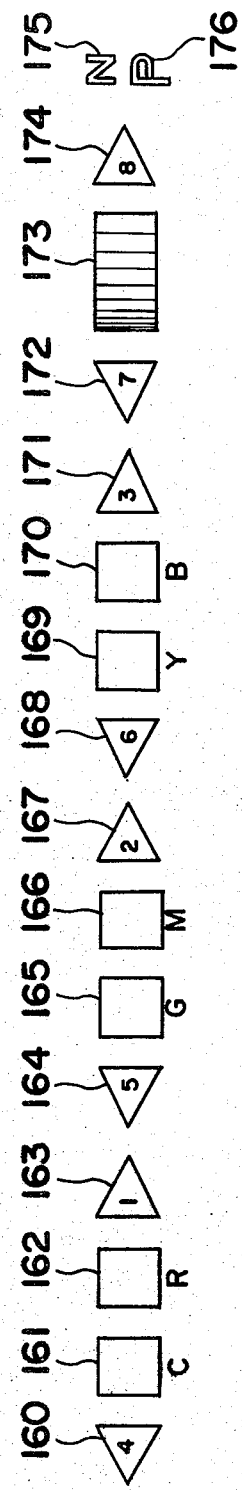
FIG. 8 is a schematic diagram showing the display mode of a display device of the enlarger to which the light emitting device according to the present invention is associated.

FIG. 7 is a block circuit diagram showing the detailed arrangement of the storage device 115 shown in FIG. 6 and FIG. 8 is an illustrative view showing the display mode of the display device. The set flash light quantity data Ftb, Ftg and Ftr from the multiplexer 114 (FIG. 6) are respectively set in registers 134, 135 and 136, and a datum output circuit 137 corresponding to the setting device 21 in FIG. 2 outputs a fixed datum of, e.g., 0.3 which serves as the constant to vary said set flash quantity datum. An addition circuit 138 outputs a datum of $1+0.3$ and a subtraction circuit 139 outputs a datum of $1-0.3$ while multiplication circuits 140 through 145 respectively output data of $1.3 \times Ftb$, $0.7 \times Ftb$, $1.3 \times Ftg$, $0.7 \times Ftg$, $1.3 \times Ftr$ and $0.7 \times Ftr$. In this case, the flash quantity data multiplied respectively by 1.3 and 0.7 correspond to a change of about 10 cc. When it is desirable to change the flash quantity data precisely by 10 cc, the data are to be multiplied respectively by 1.26 and by 0.79.

A ring-around switch $RS_2$ is provided for selecting an output datum corresponding to one of the indices as hereinafter described. A counter 130 outputs a datum showing the number of times of the closure of the ring-around switch $RS_2$. A switch NPS can be changed over between a terminal N for a negative-type printing paper and a terminal P for a positive-type printing paper, and a display circuit 133 causes a display device 175 (FIG. 8) to display "N" when the switch NPS is switched to the contact N while causing a display device 176 (FIG. 8) to display "P" when the switch NPS is switched to the contact P.

A decoder 131 functions to invert one of terminals $e_1$ through $e_9$ to a high level on the basis of a datum from the counter 130 and a signal from the switch NPS. One of the AND circuit groups 146 through 154 to which the high level signal is applied, is enabled so that the data signals B, G and R input in said enabled AND circuit group are transmitted respectively to the flash control circuits 116, 117 and 118 through an OR circuit group 155 while a display circuit 132 responds to the high level at one of the terminals $e_1$ through $e_9$ to turn on corresponding one of the indication lamps 160, 163, 164, 167, 168, 171, 172 and 174 of the display devices in FIG. 8. When the terminal $e_1$ is inverted to a high level so that the data from the registers 134, 135 and 136 are output unchanged, none of the indication lamps in FIG. 8 is turned on. Table 1 indicates the relation among the output of the counter 130, the condition of the switch NPS, the output data from the AND circuit groups and the display condition.

TABLE 1

| NPS | Counter (130) | Terminal | AND Gate | Output Data | Indicative Portion | Color Development |
|---|---|---|---|---|---|---|
| N | 0000 | $e_1$ | 147 | Ftb,Ftg,Ftr | None | Neutral |
| N | 0001 | $e_2$ | 152 | Ftb,Ftg,0.7·Ftr | 163 | Red |
| N | 0010 | $e_3$ | 151 | Ftb,1.3·Ftg,Ftr | 167 | Magenta |
| N | 0011 | $e_4$ | 148 | 0.7·Ftb,Ftg,Ftr | 171 | Blue |
| N | 0100 | $e_5$ | 153 | Ftb,Ftg,1.3·Ftr | 160 | Cyan |
| N | 0101 | $e_6$ | 150 | Ftb,0.7·Ftg,Ftr | 164 | Green |
| N | 0110 | $e_7$ | 149 | 1.3·Ftb,Ftg,Ftr | 168 | Yellow |
| N | 0111 | $e_8$ | 154 | 1.3·Ftb,1.3·Ftg,1.3·Ftr | 172 | Deep |
| N | 1000 | $e_9$ | 146 | 0.7·Ftb,0.7·Ftg,0.7·Ftr | 174 | Pale |
| NPS | Counter | Terminal (130) | AND Gate | Output Data | Indicative Portion | Color Development |
| P | 0000 | $e_1$ | 147 | Ftb,Ftg,Ftr | None | Neutral |
| P | 0001 | $e_5$ | 153 | Ftb,Ftg,1.3·Ftr | 163 | Red |
| P | 0010 | $e_6$ | 150 | Ftb,0.7·Ftg,Ftr | 167 | Magenta |
| P | 0011 | $e_7$ | 149 | 1.3·Ftb,Ftg,Ftr | 171 | Blue |
| P | 0100 | $e_2$ | 152 | Ftb,Ftg,0.7·Ftr | 160 | Cyan |
| P | 0101 | $e_3$ | 151 | Ftb,1.3·Ftg,Ftr | 164 | Green |
| P | 0110 | $e_4$ | 148 | 0.7·Ftb,Ftg,Ftr | 168 | Yellow |
| P | 0111 | $e_9$ | 146 | 0.7·Ftb,0.7·Ftg,0.7·Ftr | 172 | Deep |

TABLE 1-continued

| P | 1000 | c₈ | 154 | 1.3·Ftb,1.3·Ftg,1.3·Ftr | 174 | Pale |

As evident from Table 1, the hue of the color reproduced on the printing paper is changed successively from red to yellow with advance of counting at the counter 130. In the display device as shown in FIG. 8, one of the indication lamps 160, 163, 164, 167, 168, 171, 172 and 174 corresponding to the classified indices 161, 162, 165, 166, 169, 170 and 173 is turned on. The indices 162, 165 and 170 are respectively classified in red, green and blue while the indices 161, 166 and 169 adjacent to said indices 162, 165 and 170 are classified in cyan, magenta and yellow which are complementary colors of said red, green and blue respectively. When the output of the counter 130 is "0111", there is generated a flash quantity datum for increasing the density of the image to be printed on the printing paper while keeping the color balance unchanged and when said output is "1000", there is generated a flash quantity datum for decreasing said density with the color balance unchanged. When, for example, red prevails on the printing paper in the trial printing operation, the switch RS₂ is pressed until the indication lamp 160 for cyan complementary to red is turned on to conduct the actual printing operation. Thus, with the device of the aforementioned construction, operation workability in printing is excellent and the time required for obtaining the best print can be shortened.

Figure 9:
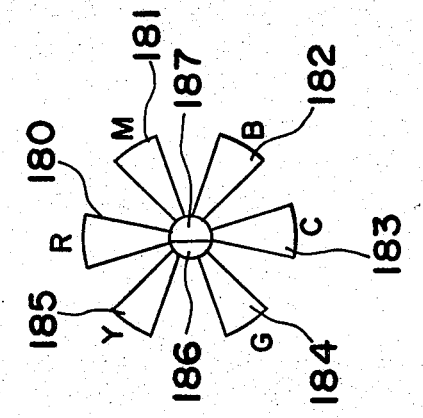
FIG. 9 is an index showing the relation of complementary colors.

FIG. 9 is an illustrative view showing color indices visually indicating a relation between complementary colors. Six color indices respectively corresponding to six colors in FIG. 8 are annularly arranged and color indices 180, 182 and 184 respectively classified in red, blue and green are provided at an angle of 120° therebetween. Color indices 183, 185 and 181 colored in cyan, yellow and magenta which are complementary to said three colors are provided in positions symmetrical with respect to the center of the circle, with said red, blue and green respectively. These six color indices 180 through 185 are annularly arranged in a clockwise manner in correspondence to an increase in values at the counter 130 as shown in Table 1. At the center of the annular color index group, there are provided two indices 186 and 187 respectively indicating deep and pale in correspondence to the index 173 shown in FIG. 8. This color index group is provided in the vicinity of the display device shown in FIG. 8 so that the operator may immediately recognize the complementary color relation in selecting a desired output datum in consideration of the color balance. That is, the operator may easily and clearly comprehend which color is to be made deep for obtaining a best print by observing the experimentally printed photograph, and then may thereby press the ring-around switch RS₂ an appropriate number of times to select a desired color combination. Operation workability of the device is thus improved by the color index group.

In case of a monochromatic polycontrast paper, the contrast between black and white in the reproduced image can be varied by changing the ratio of exposure amount between blue and green. By utilizing the device according to the present invention, desired contrast reproduction can be easily obtained in compliance with the contrast on the monochromatic original film.

As many apparently widely different embodiments of this invention and their variations and modifications may be made without departing from the spirit and scope thereof, it is to be understood that the invention is not limited to the specific embodiments thereof described herein with respect to a color photographic enlarger and a monochromatic photographic enlarger.

For example, in the arrangement as shown in FIG. 1, the multiplexer 7, the storage device 8 and the flash control circuit 9 may be replaced by a device for causing the light source 1 of the photographic enlarger to emit a predetermined amount of light. Otherwise, a light emitting device which emits a predetermined amount of light in response to a manual operation may be provided separately from the light source 1. The light emitted from the light source 1 or said separately provided light emitting device is detected by, in a similar manner to the construction shown in FIG. 1, the flash light quantity detection circuit 10 and the exposure amount detection circuit 11 while a flash quantity datum is set in the setting device 6 independently of the control of the light source 1 of the photographic enlarger. In this case, however, for detecting the flash light quantity, integration of the current of the photoelectric element is unnecessary. Then, in the same way as the construction of FIG. 1, calculations of the aforementioned formulas (1) and (2) are made to display the results of the calculation, so that the operator may manually set the quantity of light emission from the light source 1 of the photographic enlarger by a separately provided device to utilize the present invention in an analyzer.

The embodiment shown in FIG. 6 may also be modified in a similar manner as a negative color analyzer in which the outputs of the operational circuits 124, 125 and 126 are displayed.

Further, though the light source of the photographic enlarger in the embodiments is an electronic flash device, i.e., an electronic flash discharge tube which is fired a plural number of times with the flash quantity controlled every time of the firing, the present invention may also be applied to a conventional photographic enlarger utilizing as a light source an electric lamp such as a halogen lamp which is continuously energized and emits a constant light for a desired period of time. Since, in this case, the quantity of the light emitted from the light source depends on the duration of its energization, i.e., the exposure time, the flash light quantity datum to be set may be replaced by an exposure time datum, and the term "flash quantity datum in the light source of the photographic enlarger" used herein includes such a case where the quantity is measured by the exposure time. With respect to a color photographic enlarger of the color additive type, needless to say, the light source may be formed by three electric lamps which continuously emit the red light, the green light and the blue light respectively.

In either case, color balance at the light source is conveniently determined simultaneously upon determination of the light emission quantity of each of three primary colors of the light source in the aforementioned color additive type enlarger in which lights of said three primary colors are separately emitted, though, the present invention may also be applied to a color-reducing type photographic enlarger in which the light emitted from one light source having a spectral distribution in the entire visible ray region is transmitted to a film through a color compensation filter and a mixing box. In such a case, three photoelectric elements respectively having spectral sensitivities in the red, green and blue regions are provided in the mixing box or in positions receiving light through the mixing box to receive the mixed light, whereby the outputs of the photoelectric elements are integrated as detected flash quantity data while three exposure light measuring photoelectric elements sensitive to red, green and blue regions are provided also on the surface of the printing paper and the output of the photoelectric elements are integrated as detected exposure amount data. Then calculation of the aforementioned formulas (1) and (2) is conducted with the integrations of the light measurement outputs of said light measuring photoelectric elements which measure the mixed light under a condition of the enlarging optical system with which a best print has been obtained. The integrations are utilized as set light quantity data. The quantities of the light to be emitted from the light source and the amount of color compensation by the color correction filter are then adjusted in accordance with the operated or calculated values.

Further, though storage, operation, selection, generation of control signals and flash firing control are respectively carried out in separate circuit blocks, a microcomputer programmed to perform such functions may be used as a replacement thereby. In this case, the microcomputer may be programmed to carry out the process explained with respect to the above embodiments. The program is not explained here, because it would be obvious for those skilled in the art from the aforementioned explanation.

What is claimed is:

1. In a photographic enlarger including a printing light source, an optical system for projecting an image of an original film onto an exposure plane where a printing paper is to be placed, a light measuring and control data calculating device comprising:

light emitting means for emitting light to illuminate said film and to be projected through said optical system towards the exposure position;

means for causing said light emitting means to emit a given amount of light;

first light measuring means for directly measuring the light emitted from the light emitting means to generate a first output representative of the amount of the light measurement;

second light measuring means for measuring at said exposure plane, the light from the light emitting means through said optical system to generate a second output representative of the light measurement;

setting means for manually setting a datum of a light amount to be emitted from the printing light source to generate a third output representative of the set datum; and calculation means for calculating an amount of light to be emitted from the printing light source in the actual printing operation of said enlarger, said calculation being made with said first, second and third outputs.

2. The device according to claim 1, wherein said calculation means includes means for calculating a datum of the exposure from said first, second and third outputs, said exposure datum corresponding to the amount of exposure through the optical system at the condition when said first and second outputs are obtained, and means for storing the exposure datum, and means for calculating the amount of the light to be emitted in the actual printing operation from said stored datum and said first and second outputs obtained at an actual printing condition of said optical system.

3. The device according to claim 1, wherein said light emitting means is adapted to serve as said printing light source.

4. The device according to claim 1, wherein said light emitting means includes a flash tube and said first and second light measuring means respectively include a photoelectric element which generates a photoelectric output as a function of the received input and an integrating means for integrating the photoelectric output to generate said first or second output in accordance with the integration.

5. The device according to claim 1, further comprising light control means for controlling the amount of the light emitted from the printing light source selectively in accordance with said third output or to the amount calculated by said calculating means.

6. The device according to claim 4, wherein said means for controlling includes a selection means for selecting said third output and the datum of the calculated amount in response to a manual operation.

7. The device according to claim 1, wherein said calculation means comprises a division means for calculating the ratio of the data represented by said first and second outputs and a first multiplication means for multiplying the datum of said third output by the calculated ratio, means for storing the result of the multiplication, reciprocation means for calculating the reciprocal of the calculated ratio, and a second multiplication means for multiplying said stored result by said reciprocal of the ratio.

8. The device according to claim 2, wherein said memory means includes means for selectively outputting data obtained by increasing or decreasing stored data memorized therein at a predetermined rate.

9. The device according to claim 8, wherein said memory means further includes a register for storing input data, a multiplication circuit for modifying the output of said register to a value larger than said input data, a division circuit for modifying said output of said register to a value smaller than said input data and a multiplexer for alternatively outputting one of the outputs from said register, multiplication circuit and division circuit.

10. The device according to claim 9, wherein said multiplexer is controlled by a ternary counter which has its contents changed by signals from a manually operated switch, to alternatively output one of three flash quantity data from said register, multiplication circuit and division circuit.

11. The device according to claim 9, wherein said predetermined rate for increasing or decreasing said storage data is set by a manual setting means.

12. The device according to claim 3, wherein said light source includes a flash tube and said light control means includes means for firing said flash tube a number of times by a unit quantity.

13. The device according to claim 12, wherein said means for firing includes means for reducing the amount of said unit flash quantity as the total amount of the emitted flash light approaches a predetermined value.

14. The device according to claim 12, wherein the flash control means comprises a first shift circuit for dividing the desired amount of the flash light memorized in the memory means by sixteen, a second shift circuit for dividing the output data of the first shift circuit by two, a third shift circuit for dividing the output data of the second shift circuit by two, a multiplexer for outputting one of the output data of the first shift circuit, second shift circuit and third shift circuit, a subtraction circuit for subtracting the amount of the light measured by the first light measuring means from the desired amount of the flash light and means for comparing the output of the subtraction circuit with one of reference values, whereby the output of the comparing means is applied to the multiplexer for selection of the input to be applied thereto.

15. A photographic enlarger which comprises:
a light source for illuminating a film set in the enlarger;
an optical system for projecting the picture image of the film onto an exposure plane where a printing paper is placed;
light control means for causing said light source to emit light of a desired amount;
first light measuring means for directly measuring the light emitted from the light source to generate a first output representative of the light measurement;
second light measuring means for measuring, at the exposure plane, the light projected through the optical system, to generate a second output representative of the light measurement;
setting means for manually setting a datum of the amount of light to be emitted from the light source; and
calculation means for calculating an amount of the light to be emitted from the light source in an actual printing operation of said enlarger.

16. The device according to claim 15, wherein said calculation means includes means for calculating a datum of the exposure from said first, second and third outputs, said exposure datum corresponding to the amount of exposure through the optical system at the condition when said first and second outputs are obtained, and means for storing the exposure datum, and means for calculating the amount of the light to be emitted in the actual printing operation from said stored datum and said first and second outputs obtained at an actual printing condition of said optical system.

17. The device according to claim 15, wherein said light source includes a flash tube and said first and second light measuring means respectively include a photoelectric element which generates a photoelectric output as a function of the received output and an integrating means for integrating the photoelectric output to generate said first or second output in accordance with the integration.

18. The device according to claim 15, further comprising light control means for controlling the amount of the light emitted from the light source selectively in accordance with said third output or to the amount calculated by said calculation means.

19. The device according to claim 15, wherein said calculation means comprises a division means for calculating the ratio of the data represented by said first and second outputs and a first multiplication means for multiplying the datum of said third output by the calculated ratio, means for storing the result of the multiplication, reciprocation means for calculating the reciprocal of the calculated ratio, and second multiplication means for multiplying said stored result by said reciprocal of the ratio.

20. A method of determining an amount of printing light for use with a photographic enlarger which includes a printing light source adapted for illuminating an original film set in the enlarger and an optical system for projecting an enlarged image of the film onto an exposure plane on which a printing paper is placed, said method comprising the steps of:
setting a standard or test film in the enlarger;
setting the optical system to a first condition;
setting in a setting means an amount of light to; be emitted for printing such that the setting means generates output data corresponding to the set amount of light;
causing the light source to emit a given amount of light under a first condition of the optical system;
directly measuring the light from the light source;
measuring, at the exposure plane, the light traversing the film and projected by the optical system in the first condition;
calculating the amount of exposure on the exposure plane, from the direct light measurement, the projected light measurement and the output data of the setting means;
memorizing said calculated exposure amount in a memory means;
setting an original film with an image to be printed, in the enlarger;
adjusting the optical system to a second condition;
causing the light source to emit light under the second optical condition;
directly measuring the light emitted secondly from the light source;
measuring the light projected on the exposure plane by the optical system under the second condition; and
calculating the amount of the light to be emitted for the printing with the newly set original film under the second condition of the optical system, said calculation being performed on the basis of the direct light measurement, projected light measurement under the second condition of the optical system and memorized exposure amount datum.

21. The method according to claim 20, wherein said step of calculating the amount of the exposure includes a step of multiplication of the set amount of the light by the ratio of the direct light measurement to the projected light measurement and the step of calculating the light to be emitted for printing includes calculation of a reciprocal of the ratio of the second direct light measurement to the second projected light measurement and a step of multiplying the exposure amount in the memory means by the reciprocal.

22. The method according to claim 21, further comprising the step of performing a trial printing to find out a proper amount of light emitted to provide a desired print, the proper amount of light being set in said step of setting an amount of light for printing.

23. The method according to claim 22, further comprising the step of controlling the amount of the printing light in accordance with the datum of the calculated amount of printing light.

24. The method according to claim 23, wherein said light source is commonly used for the light measuring operations and for printing.

25. A device for determining an amount of light to be emitted for color printing in a color photographic enlarger which includes a light source for illuminating a film set in the enlarger and an optical system for projecting a picture image of the film onto an exposure plane where a color printing paper is to be placed, said device comprising:

first light detecting means for detecting red, green and blue components of the light emitted from the light source to generate first outputs representative of the measurements of the red, green and blue light components;

second light detecting means for detecting the red, green and blue components of the light at the exposure plane emitted from the light source, traversing the film and projected by the optical system to generate second outputs representative of the measurements of the red, green and blue components of the projected light;

setting means for manually setting amounts of red, green and blue lights to be emitted for printing; and calculating means for calculating the amounts of red, green and blue lights to be emitted for printing an image of a film on the color printing paper, said calculation being made from first and second outputs and the data of the amounts of the red, green and blue lights set in the setting means.

* * * * *